United States Patent [19]

Ferrari Aggradi et al.

[11] Patent Number: 4,695,202
[45] Date of Patent: Sep. 22, 1987

[54] SYSTEM OF SUBMARINE LINKING BETWEEN THE LEGS OF A PLATFORM AND THE RELATING FOUNDATION PILES

[75] Inventors: Gian P. Ferrari Aggradi, Barberino di Mugello; Cesare M. Ferrante, Florence, both of Italy

[73] Assignee: Nuovo Pignone S.p.A., Florence, Italy

[21] Appl. No.: 859,008

[22] Filed: May 2, 1986

[30] Foreign Application Priority Data

May 3, 1985 [IT] Italy .................. 20570 A/85

[51] Int. Cl.$^4$ ............................................. E02B 17/00
[52] U.S. Cl. ..................................... 405/227; 405/224
[58] Field of Search ............... 405/196, 197, 199, 224, 405/227

[56] References Cited

U.S. PATENT DOCUMENTS

| | | | |
|---|---|---|---|
| 4,255,069 | 3/1981 | Yielding | 405/196 |
| 4,472,084 | 9/1984 | Boon | 405/196 |
| 4,493,592 | 1/1985 | Knox | 405/227 |
| 4,501,514 | 2/1985 | Lowes | 405/227 |
| 4,585,374 | 4/1986 | Regalbuto et al. | 405/227 |

FOREIGN PATENT DOCUMENTS 0609863 6/1978 U.S.S.R. .......................... 405/196

Primary Examiner—David H. Corbin
Attorney, Agent, or Firm—Hedman, Gibson, Costigan & Hoare

[57] ABSTRACT

System of submarine linking between the anchoring cylinders of the legs of a platform and the relating foundation piles in which the anchoring cylinders are constituted each by two coaxial cylinders defining between each other a radially expansible annular interspace, the inner cylinder being made of steel with yield strength not higher than the half of the yield strength of the relating foundation pile, which is provided in its turn, in the zones wherein the linkage is to be accomplished, with an inner thickening and with a sequence of slots and toothings on its outer surface as well as, possibly, with inner peripheral ribs.

3 Claims, 3 Drawing Figures

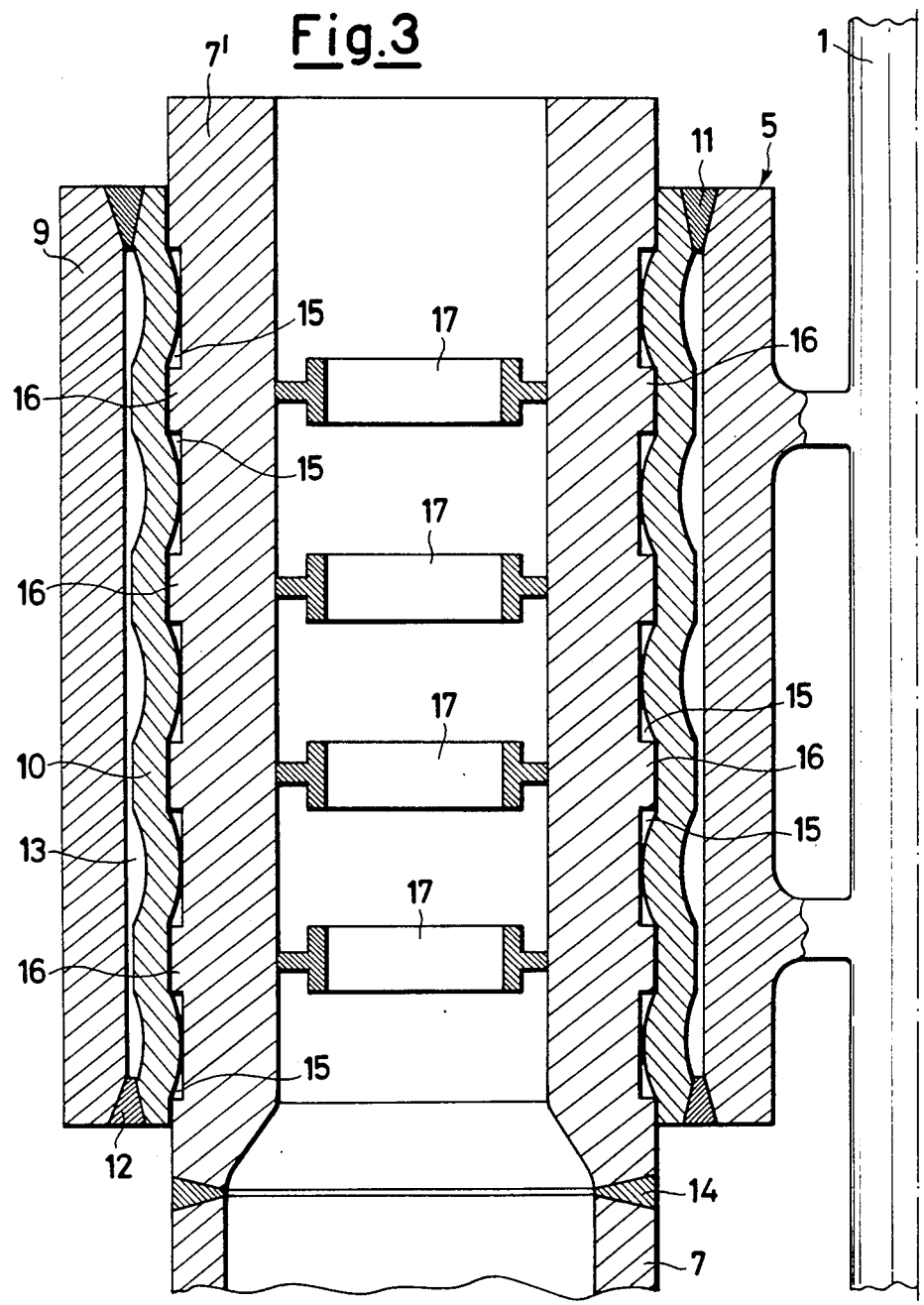

SYSTEM OF SUBMARINE LINKING BETWEEN THE LEGS OF A PLATFORM AND THE RELATING FOUNDATION PILES

The present invention relates to a new system which allows a fast, cheap and highly efficient submarine link to be provided between each leg of a platform and the relating foundation piles.

It is know that each leg of a platform is constituted by a steel structure, to which a set of four or more anchoring cylinders are fastened, which act as guides for the foundation piles during the step of impacting of the same to the purpose of driving them into the sea bottom; said piles must then be locked inside the said anchoring cylinders by a link which must withstand various types of combined stresses such as axial tension, shear stress, bending and twisting torque.

According to the prior art, the most used conventional system to accomplish said connection linking consists in injecting pressurized cement into the interspace existing between the foundation piles and the anchoring cylinders, displacing water, and then waiting for cement to set.

Such a know system is very complex and hence not very cheap, because it involves, among others, the presence of expensive ancillary equipment, such as inflatable sealing devices to prevent cement from escaping outside the interspace, pipings to inflate the said sealing devices, pipings for water displacement. It shows morever several drawbacks, the most evident of which consist in the difficulty in controlling the injection operation, so that no guarantee exists that the interspace be completely filled, in the poor reliability of the link with consequent use of high safety coefficients in the computation of the link length, and hence need for long anchoring cylinders to be used, and finally in the need of long dead times, of the order of even a week, waiting for the cement to set.

Purpose of the present invention is to overcome the said drawbacks and to supply hence a system which allows an easy, cheap, reliable, controllable and fast link to be attained between the foundation piles and the relating anchoring cylinders of each leg of a platform.

That purpose is substantially achieved by the fact that the said linking is accomplished in a completely mechanical way with transfer of the loads from metal and not any longer through cement, and thus with a complete control of the operation, that allows a proper and precise ad hoc dimensioning of the structure with consequent considerable saving in material.

Precisely, the system of submarine link between the anchoring cylinders affixed to each leg of a platform and the relating foundation piles is characterized according to the present invention in that the said anchoring cylinders are each constituted by two coaxial cylinders, an outer cylinder of greater thickness made of steel having high yield strength and an inner cylinder of lower thickness made of steel having low yield strength, butt-welded to each other so as to define between them an annular chamber or interspace radially expansible by the application of pressure, and in that the relating foundation pile is made, in its zones in which the link is to be accomplished, of steel having high yield strength and is provided on its outer surface with a sequence of slots and toothings, and with an inner thickening.

In such a way, an efficient link is accomplished by simply pressurizing the said annular chamber or interspace.

In fact, by injecting into the said annular interspace presurrized oil up to a pressure of value close to the yield point of the higher yield strength steel, the outer cylinder of the anchoring cylinder is only elastically deformed, whilst the inner cylinder having low yield strength gets yielded and collapses plastically inwards, penetrating the said slots of the foundation pile and being forced against the wall of said pile, which too is submitted to a stress close to its yield point. When the oil pressure is released, the different elastic return of the materials constituting the foundation pile and the inner cylinder of anchoring cylinder guarantees hence a residual interference between the two elements and consequently a residual contact pressure which, additionally added to the slots penetration effect, guarantees the resistance of the link to all the stresses which shall be applied to it throughout the platform life.

Moreover, to the purposes of preventing that such a foundation pile may collapse due to elastic instability, according to another characteristic of the present invention said foundation pile is furthermore provided, in addition to the above said region with greater thickness, with inner peripheral ribs.

Finally, according to a preferred form of embodiment of the present invention, the said inner cylinder of the said anchoring cylinder is made of steel with yield strength not higher than the half of the yield strength of the foundation pile.

The invention is now better explained referring to the attached drawings, which illustrate a preferred form of practical embodiment, given to purely exemplifying and not limitative purpose, because it shall always be possible to supply technical, technological and structural variants without going outside the scope of the present invention.

In said drawings:

FIG. 3 shows a front sectional view similar to that of FIG. 2, but taken after the said linking between the anchoring cylinder and the foundation pile having been carried out.

Figure 1:
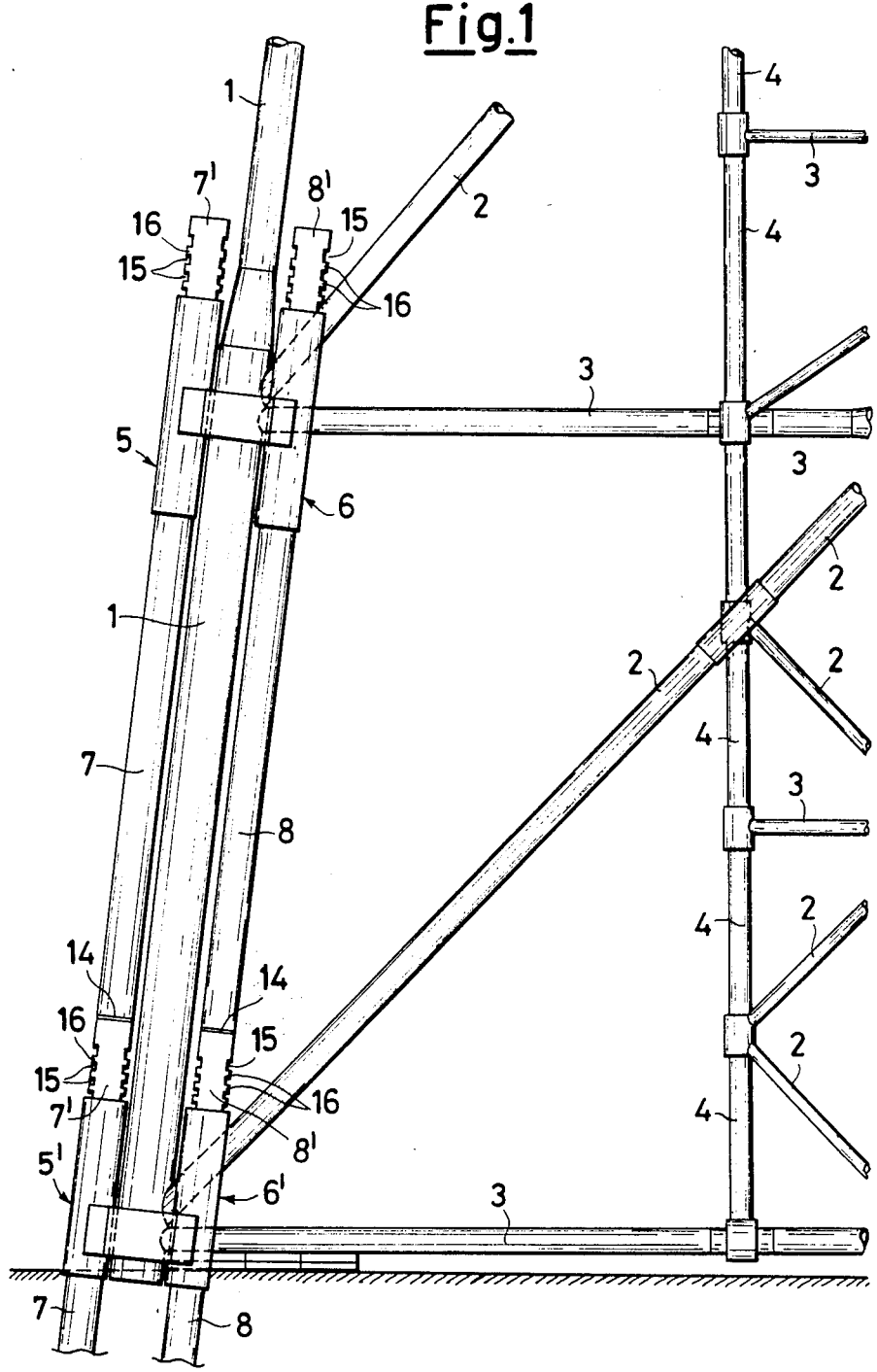
FIG. 1 shows a partial view of a leg of a platform the anchoring cylinders of which are linked to the relating foundation piles according to the system of the present invention.
Figure 2:
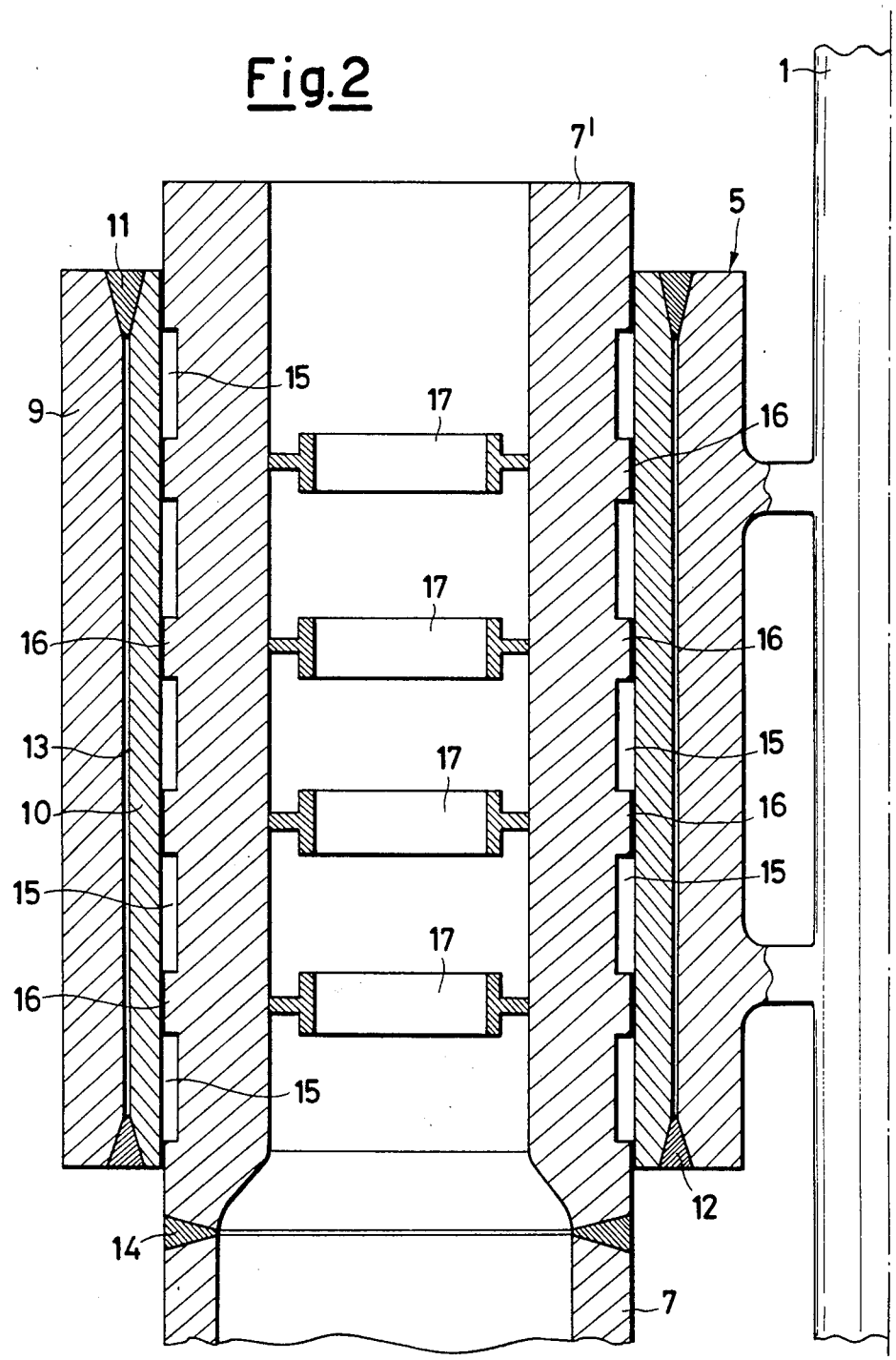
FIG. 2 shows a front sectional view of an anchoring cylinder and of the relating foundation pile according to the invention, before being linked to each other.

Referring to the figures, by 1 the leg of a platform is indicated, which is linked to the other legs by the trestlework structure 2, 3 and 4, and to which a set are fastened of anchoring cylinders, respectively 5,5'; 6 and 6', which act as guide for the foundation piles, respectively 7 and 8.

Each anchoring cylinder 5,5'; 6,6' is constituted by an outer cylinder 9 of steel having high yield strength and by an inner cylinder 10 coaxial to and with lower thickness than the first one, made of steel having a low yield strength, preferably lower than the half of the yield strength of the outer cylinder 9 and of the relating foundation pile 7. The two coaxial cylinders 9 and 10 are butt-welded to each other by means of the circumferential welds 11 and 12, so as to define an annular chamber or interspace 13.

The foundation piles 7 or 8 are moreover made, in the regions wherein the link is to be accomplished, as indicated by 7' or 8', of high yield strength steel and are fastened to the residual pile portion by the peripheral welds 14. Said portions 7' or 8' are provided with an inner thickening and, on their outer surface, with a sequence of slots 15 and toothings 16. Inside said portions 7' or 8', peripheral ribs 17 can be furthermore provided.

In FIG. 3 the plastic deformation is shown, suffered by the inner cylinder 10 of the anchoring cylinder after the linking having been carried out.

We claim:

1. A system for submarine linking between anchoring cylinders affixed to a platform leg and a related foundation pile, characterized in that said anchoring cylinders are composed of two coaxial cylinders, one of which is an outer cylinder having a substantial thickness of high yield strength steel, the other of which is an inner cylinder having a thickness of low yield strength steel, said thickness being less than the thickness of said outer cylinder, wherein said outer cylinder and said inner cylinder are butt-welded to each other at their ends so as to define an annular chamber between said cylinders, said chamber being radially inwardly expansible by the application of pressure therein, and wherein said related foundation pile is composed of high yield strength steel in a zone where said submarine linking is to be accomplished said zone of said pile including an outer surface with alternating slots and toothing and an inner thickened surface.

2. The system according to claim 1, wherein said foundation piles are provided with inner peripheral ribs.

3. The system according to claim 1, wherein said inner cylinder of said anchoring cylinder is composed of steel having a yield strength up to and including one-half the yield strength of said foundation pile.

* * * * *